United States Patent [19]

Olson

[11] Patent Number: 4,680,980
[45] Date of Patent: Jul. 21, 1987

[54] DRIVE MECHANISM

[75] Inventor: George E. Olson, Arlington Heights, Ill.

[73] Assignee: A. O. Smith Harvestore Products, Inc., Arlington Heights, Ill.

[21] Appl. No.: 783,774

[22] Filed: Oct. 3, 1985

[51] Int. Cl.$^4$ .............................................. F16H 29/00
[52] U.S. Cl. ..................................... 74/125; 74/125.5
[58] Field of Search .............. 74/116, 122, 125, 125.5, 74/412 TA, 470

[56] References Cited

U.S. PATENT DOCUMENTS

| | | | |
|---|---|---|---|
| 2,635,770 | 4/1953 | Tiedemann | 214/17 |
| 2,692,510 | 10/1954 | Gille | 74/125 |
| 3,519,152 | 7/1970 | Broberg | 214/17 |
| 3,962,925 | 6/1976 | Olson | 74/143 |
| 4,437,806 | 3/1984 | Olson | 414/307 |
| 4,487,085 | 12/1984 | Collins | 74/125.5 |

Primary Examiner—David H. Corbin
Attorney, Agent, or Firm—Andrus, Sceales, Starke & Sawall

[57] ABSTRACT

A drive mechanism for imparting intermittent movement to an output member. The drive mechanism includes a rotatable input member which operates through a crank to move a beam with oscillatory or reciprocating movement. The beam is interconnected with a one-way overrunning clutch associated with the output member so that oscillatory movement of the beam is transmitted to the clutch. The clutch is designed such that rotation of the clutch in a first direction will cause the clutch to engage the output member to rotate the output member, while the clutch is freely rotatable with respect to the output member in a second direction. A resilient member, such as a compression spring, interconnects one end of the beam and the clutch and if the output member encounters an excessive load, oscillation of the beam in the first direction will compress the spring to provide overload protection for the drive. A second overrunning clutch can also be associated with the output member and is fixed against rotation. The second clutch permits rotation of the output member in the first direction, but prevents rotation in the second or reverse direction to thereby prevent back driving of the output member due to torsional feedback during the return stroke of the first clutch.

10 Claims, 3 Drawing Figures

U.S. Patent   Jul. 21, 1987   4,680,980
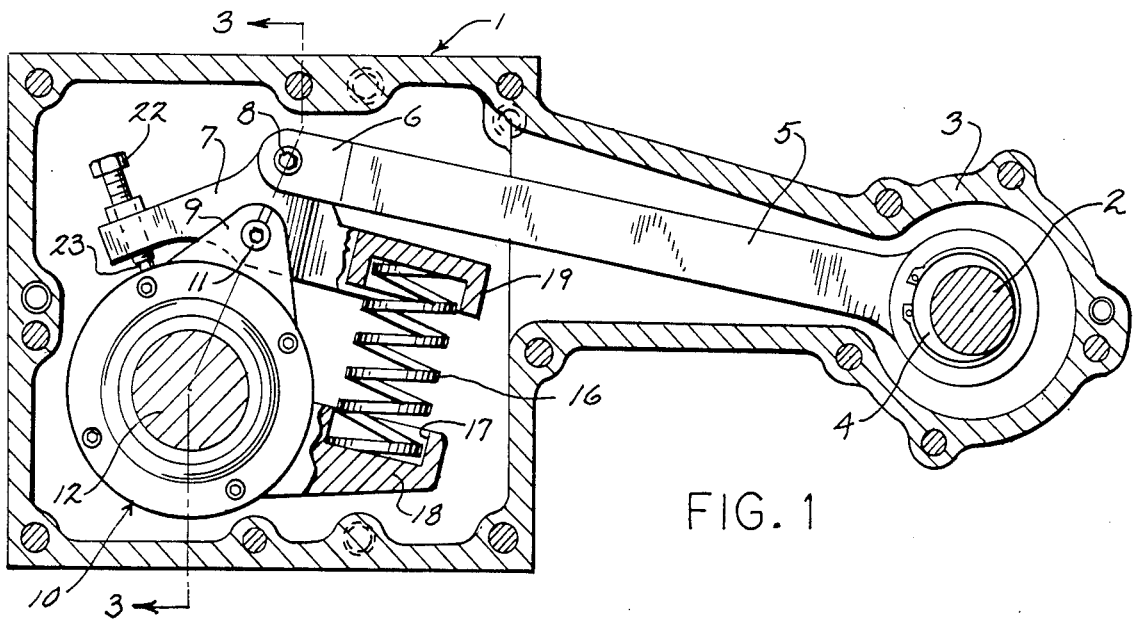
FIG. 1
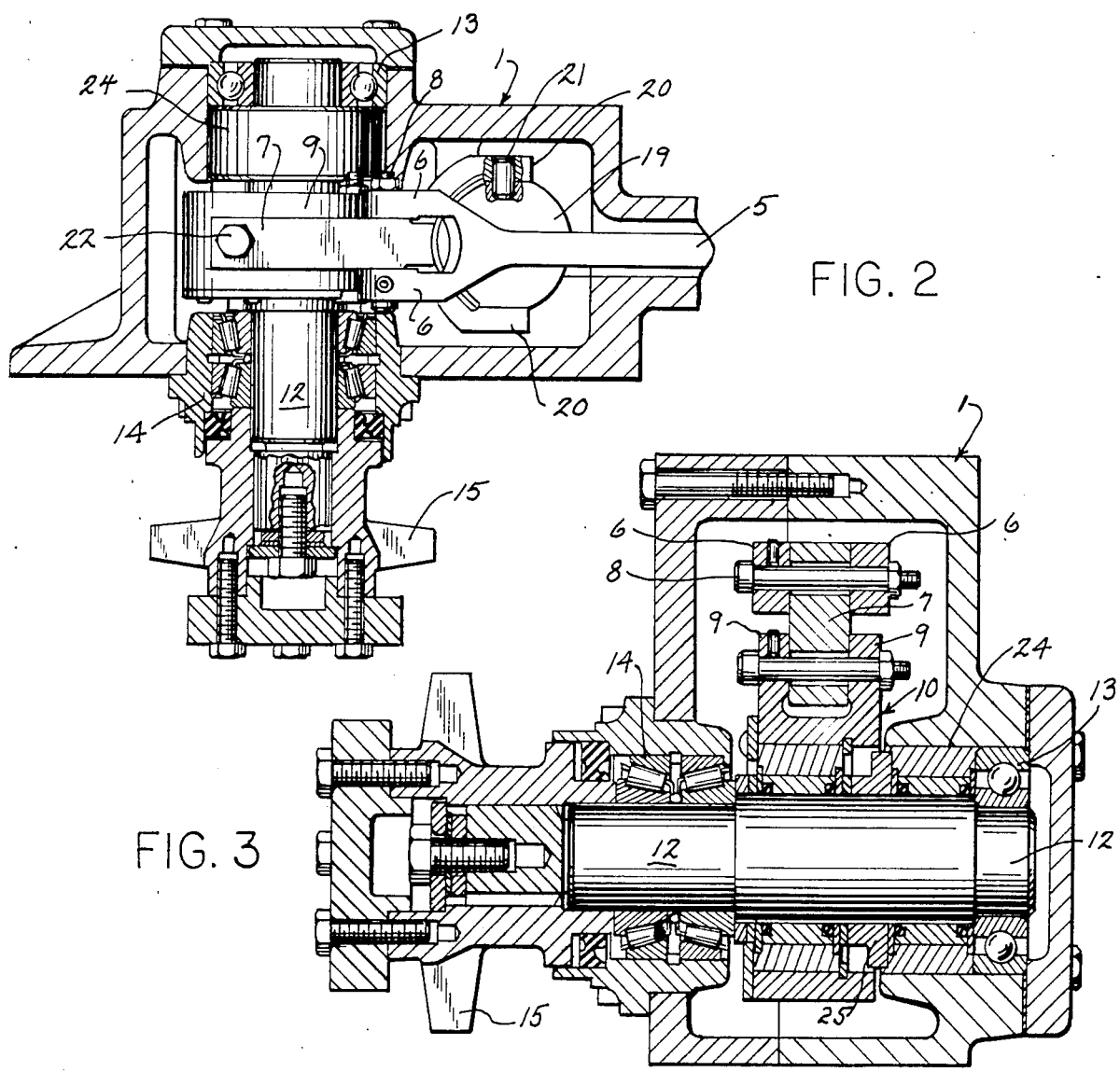
FIG. 2
FIG. 3

DRIVE MECHANISM

BACKGROUND OF THE INVENTION

Storage structures for storing silage, grain, or other materials frequently employ a bottom unloader to unload the stored material. The bottom unloader is mounted for rotation at the center of the foundation of the structure and is adapted to dislodge the stored material as it rotates in the structure and convey the dislodged material to the center of the structure where it is delivered to a radially extending trough formed in the foundation of the structure. With the storage of non-free flowing materials, such as silage, the bottom unloader may include a cutter chain that travels in an endless path on the cutter arm as the arm rotates within the silo. With free flowing material, such as grain, the bottom unloader may take the form of an auger which rotates about the structure and simultaneously rotates about its own axis. The auger acts to dislodge and convey the stored material toward the center of the structure where it is deposited in the trough and conveyed to the exterior.

In the past the unloaders have been driven by a motor located on the outside of the structure and a drive mechanism interconnects the motor with the inner end of the sweep arm at the center of the storage structure. Intermittent motion can be provided for the arm by a ratchet and pawl mechanism, as disclosed in U.S. Pat. No. 2,635,770. As shown in the aforementioned patent, an overload protection device can also be incorporated in the drive in the event the sweep arm encounters an obstruction which prevents rotation of the sweep arm.

SUMMARY OF THE INVENTION

The invention is directed to an improved drive mechanism and more particularly to a drive mechanism for imparting intermittent movement to an output member. The drive mechanism of the invention has particular application for driving a sweep arm for a bottom unloader in a storage structure, but can a be used in various other applications where intermittent drive is to be transmitted to the output member.

In accordance with the invention, a rotatable input shaft operates through a crank to move a walking beam with an oscillatory or reciprocating movement. The beam is interconnected with a one-way overrunning clutch that is associated with the output shaft so that oscillatory movement of the beam is transmitted to the clutch. The clutch is designed so that rotation of the clutch in a first direction will cause the clutch to engage the output shaft to rotate the output shaft, while the clutch is freely rotatable with respect to the output shaft in the opposite or second direction. With this construction, oscillation of the clutch will drive the output shaft with intermittent motion in the first direction.

To provide overload protection for the drive, a resilient member, such as a compression spring, is interconnected between one end of the walking beam and the clutch. If the output shaft encounters an excessive load, the oscillation of the beam in the first direction will compress the spring to thereby provide overload protection for the drive.

A second overrunning clutch can also be associated with the output shaft and mounted in a fixed or non-rotatable condition. The second clutch is arranged to permit rotation of the output shaft in the first direction, but prevents rotation of the output shaft in the second direction to thereby prevent back driving of the output shaft due to torsional feedback during the return or non-driving stroke of the first clutch.

The drive mechanism of the invention has a wider selection of input to output speed ratios than drive mechanisms as used in the past. The speed ratio can be readily changed by merely changing the size of the eccentric or cam associated with the crank which will thereby change the throw of the crank and the magnitude of the oscillatory movement. This is a substantial advantage over drive systems utilizing a ratchet and pawl mechanism in which it is necessary to change both the pawl and ratchet in order to vary the input to output speed ratio.

The drive mechanism of the invention is extremely compact in size and a decrease in size results in a corresponding decrease in overall cost of the unit. Further, the drive mechanism employs standard shelf-item parts which further reduces the cost of the unit over drive mechanisms which require custom designed components.

For its size the drive mechanism of the invention is capable of transmitting greater torque than drives as used in the past.

The drive mechanism can be employed as a precise indexing drive in which the incremental advance of the output shaft can be accurately controlled and there is no backlash in the drive mechanism.

The compression spring, which interconnects the walking beam and the clutch, provides a convenient manner of providing overload protection and the spring force can be readily adjusted to control the overload conditions.

The drive mechanism of the invention has particular application for use in driving a chain cutter arm of a bottom unloader in a rotary path about the center of a silo to dislodge stored material, such as silage, or for use in rotating an auger-type sweep arm about the center of a storage structure to dislodge a free flowing stored material, such as grain. The drive mechanism can be located either inside or outside of the storage structure and operably connected to either the inner or outer end of the sweep arm.

Other objects and advantages will appear in the course of the following description.

DESCRIPTION OF THE DRAWINGS

The drawings illustrate the best mode presently contemplated of carrying out the inention.

In the drawings:

FIG. 1 is a longitudinal section of the drive mechanism of the invention;

FIG. 2 is a plan view of the drive mechanism with parts broken away in section; and FIG. 3 is a section taken along line 3—3 of FIG. 2.

DESCRIPTION OF THE ILLUSTRATED EMBODIMENT

The drawings illustrate a drive mechanism including an outer housing 1 and an input shaft is suitably journalled for rotation within an extension 3 of housing 1.

As shown in FIG. 1, shaft 2 carries an eccentric or cam 4 and one end of a crank arm 5 is mounted on the eccentric 4, while the opposite end of crank arm 5 is provided with a clevis 6 which is pivotally connected to the central portion of walking beam 7 by pivot 8.

Crank arm 5 serves to convert the rotary motion of input shaft 2 to oscillatory or reciprocating motion for the walking beam 7.

The central portion of beam 7 is connected to ears 9 of clutch 10 by pivot 11. Clutch 10 surrounds output shaft 12 and the two pivots 11 and 8 extends along a radius of the shaft 12, as shown in FIG. 1. Clutch 10 is a conventional one-way overrunning clutch and in itself forms no part of the invention. Clutch 10 is constructed so that it will engage shaft 12 when the beam 7 and clutch 10 are oscillated in a first direction and will disengage the shaft 12, so that the clutch can be rotated relative to the shaft, when beam 7 and clutch 10 are oscillated in the opposite or second direction. With this construction, oscillation of beam 7 and clutch 10 will act to rotate the shaft in the first direction in an intermittent or stepped manner. In normal practice the clutch 10 and shaft 12 may oscillate through an arc of about 3.6°.

As illustrated in FIGS. 2 and 3, one end of shaft 12 is journalled in housing 1 by a ball bearing assembly 13, while the central portion of the shaft is journalled in the opposite end of the housing by a needle bearing assembly 14. The outer end of shaft 12 can carry an output member such as sprocket 15.

To provide overload protection for the drive, a compression spring 16 is interposed between a seat 17 formed in lug 18 on clutch 10 and a seat 19 that is pivoted between arms 20 of beam 7 by pins 21.

During normal operating conditions, there is no relative movement between beam 7, clutch 10 and seat 17, so that the force of the spring 16 will not vary. In the event an overload condition is encountered, as for example, the output member encountering an obstruction so that output shaft 12 cannot rotate, oscillation of the beam 7 in the first direction, instead of providing corresponding oscillation of clutch 10, will act to compress spring 16, thereby providing overload protection until the overload condition is remedied.

To adjust the force of spring 16, a set screw 22 is threaded in an opening in the end of beam 7 and the end 23 of screw 22 engages the outer surface of clutch 10. By threaded adjustment of screw 22, the force on spring 16 can be varied.

To maintain the position of the output shaft and prevent back driving, a second overrunning clutch 24 is associated with the output shaft 12. As best illustrated in FIG. 3, clutch 24 is spaced from clutch 10 by annular spacer 25 and clutch 24 is fixed to the housing so that it cannot rotate. If there is a substantial load on the output shaft, it is possible to get torsional feedback during the reverse stroke of the clutch 10 and beam 7. Clutch 24 is constructed to permit rotation of output shaft 12 in the first direction, but prevent rotation in the second or reverse direction and thus will prevent back driving of the output shaft during the return stroke of clutch 10.

It is contemplated that reverse rotation of output shaft 12 can be achieved by reversing the operation of the two cluches 10 and 24. More particularly, to obtain reverse direction output, clutch 24 could be connected to the walking beam and clutch 10 fixed against rotation.

With the drive mechanism of the invention, the input-output speed ratio can be readily changed by changing the size of the eccentric or cam 4 to thereby change the throw of the crank.

As a further advantage, the drive provides precise indexing, and as there is no over-travel of the operating components there is no back lash in the system.

The drive is a compact unit which is capable of transmitting more torque for its size than conventional drive mechanisms.

Various modes of carrying out the invention are contemplated as being within the scope of the following claims particularly pointing out and distinctly claiming the subject matter which is regarded as the invention.

I claim:

1. A drive mechanism, comprising a supporting structure, an oscillating member mounted to move in an oscillating path of travel relative to said supporting structure, drive means to impart oscillatory movement to said oscillating member, a rotatable output member, first overrunning clutch means associated with the output member, said first clutch means being constructed and arranged so that rotation of said first clutch means in a first direction causes said first clutch means to engage the output member to thereby rotate said output member in said first direction, said first clutch means being freely rotatable relative to said output member in a second direction, and means interconnecting the oscillating member and said clutch means for transmitting oscillatory motion to said clutch means to alternately move said clutch means in said first and second directions, resilient means interconnecting said oscilalting member and said first clutch means, said resilient means constructed and arranged to be compressed by oscillatory movement of said oscillating member in said first direction during conditions when said output member encounters a predetermined excessive load to thereby provide overload protection for said mechanism, one end of said resilient means being engaged with said first clutch means, and said mechanism includes a seat on said oscillating member, the opposite end of said resilient means being engaged with said seat, and means for mounting said seat for pivotal movement relative to said oscillating member.

2. The drive mechanism of claim 1, and including second clutch means associated with said output member, said second clutch means being constructed and arranged to permit rotation of said output member in said first direction, but preventing rotation of said output member in said second direction to thereby prevent back driving of said output member when said first cluch means is rotated in said second direction.

3. The drive mechanism of claim 1, whereby said oscillating member comprises a beam, the central portion of said beam being pivotally connected to said first clutch means.

4. The drive mechanism of claim 1, wherein said resilient means comprises a compression spring.

5. The drive mechanism of claim 1, wherein said drive means comprises a rotatable input shaft and crank means interconnecting input shaft and said oscillating member.

6. A drive mechanism, comprising a supporting structure, an input shaft journalled in said supporting structure, an oscillating member mounted to move in an oscillatory path relative to said supporting structure, drive means interconnecting the input shaft and said oscillating member for imparting oscillatory movement to said oscillating member, a rotatable output shaft journalled in said supporting structure, first annular overrunning clutch means disposed around said output shaft, said first clutch means being constructed and arranged so that rotation of said clutch means in a first direction causes said clutch means to engage the output shaft to rotate said output shaft in said first direction and said clutch means being constructed and arranged to be freely rotatable relative to said output shaft when said clutch means is rotated in a second direction, connecting means interconnecting the oscillating member and said clutch means for transmitting oscillatory motion of said oscillating member to said clutch means to alternately move said clutch means in said first and second directions, and a resilient member interconnected between said oscillating member and said cluch means, said oscillating member and said clutch means and said resilient member disposed to oscillate as a unit about the axis of said output shaft during normal load conditions, said resilient member being constructed and arranged to be compressed by oscillatory movement of said oscillating member in said first direction when said output shaft encounters a predetermined excessive load to thereby prevent the transmission of oscillatoiry movement to said clutch means and provide overload protection for said mechanism.

7. The drive mechanism of claim 6, wherein said resilient member is a compression spring, said mechanism including a seat to receive one end of said spring, and means pivotally connecting said seat to said oscillating member whereby lateral deflection of said spring is prevented as the spring is compressed.

8. The drive mechanism of claim 6, and including means for preventing lateral deflection of said resilient member when said resilient member is compressed.

9. The drive mechanism of claim 6, wherein said clutch means is annular and surrounds said outpuit shaft, said resilient member interconnecting the periphery of said clutch means and a portion of said oscillating member at a location offset from the connection of said connecting means to said oscillating member.

10. A drive mechanism, comprising an output shaft, a first annular overunning clutch disposed around said output shaft, said first clutch being constructed and arranged so that rotation of said first clutch in a first direction causes said first clutch to rotate said output shaft in said first direction and said first clutch being constructed and arranged to be freely rotatable relative to said output shaft when said first clutch is rotated in a second direction, drive means for alternately moving said first clutch in said first and second directions, a second annular overrunning clutch disposed around said output shaft, and means for preventing rotation of said second clutch, said second clutch being constructed and arranged to permit rotation of the output shaft in said first direction and constructed and arranged to prevent rotation of said output shaft in said second direction to thereby prevent torsional back driving of said output shaft during movement of said first clutch in said second direction.

* * * * *